United States Patent
Dunsmoir et al.

(10) Patent No.: US 7,633,383 B2
(45) Date of Patent: Dec. 15, 2009

(54) SYSTEMS AND ARRANGEMENTS FOR PROVIDING SITUATIONAL AWARENESS TO AN OPERATOR OF A VEHICLE

(75) Inventors: John W. Dunsmoir, Round Rock, TX (US); Sivakumar Jambunathan, Round Rock, TX (US); Sheryl S. Kinstler, Dripping Springs, TX (US); Thomas H. Barnes, Austin, TX (US); Carol S. Walton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/464,855

(22) Filed: Aug. 16, 2006

(65) Prior Publication Data

US 2008/0042812 A1 Feb. 21, 2008

(51) Int. Cl.
*B60Q 1/00* (2006.01)

(52) U.S. Cl. .................. 340/435; 340/903; 340/937; 348/148; 348/149

(58) Field of Classification Search .......... 340/937, 340/961, 435–436, 903; 348/148; 701/301
See application file for complete search history.

(56) References Cited

U.S. PATENT DOCUMENTS

| | | | |
|---|---|---|---|
| 4,257,703 A * | 3/1981 | Goodrich | 356/4.03 |
| 5,612,883 A | 3/1997 | Shaffer et al. | |
| 6,898,319 B1 | 5/2005 | Hazra et al. | |
| 7,006,667 B2 | 2/2006 | Akutagawa | |
| 7,038,577 B2 | 5/2006 | Pawlicki et al. | |
| 7,132,933 B2 * | 11/2006 | Nakai et al. | 340/435 |
| 7,373,292 B1 * | 5/2008 | Coyne et al. | 704/9 |
| 7,387,413 B2 * | 6/2008 | Brinkmann et al. | 362/460 |
| 2005/0206511 A1 | 9/2005 | Heenan et al. | |
| 2005/0232464 A1 | 10/2005 | Ihara et al. | |

* cited by examiner

*Primary Examiner*—Brent Swarthout
(74) *Attorney, Agent, or Firm*—William H. Steinberg; Schubert Osterrieder & Nickelson PLLC (57) ABSTRACT

Vehicular situational awareness systems, method and arrangements are disclosed herein. In one embodiment digitized video can be acquired by a camera on a vehicle, and utilizing pixel differentiation at least one area of interest in the digitized video can be identified. The area of interest could be, for example, a group of pixels that represent another vehicle, a sign etc. Attribute information for the area of interest, such as size, movement etc. of an object, can be acquired and then it can be determined if the attribute information is significant enough or important enough to set an alarm condition and notify the driver.

20 Claims, 4 Drawing Sheets

SYSTEMS AND ARRANGEMENTS FOR PROVIDING SITUATIONAL AWARENESS TO AN OPERATOR OF A VEHICLE

FIELD OF INVENTION

The present disclosure is in the field of detecting situations for an operator of a vehicle, and in particular, to methods and arrangements for improving situational awareness for an operator of a vehicle.

BACKGROUND

In 2005, the United States announced a record 43,200 traffic related deaths. Many of these accidents could be prevented if the driver had been warned of the impending danger. A disproportionately high number of these deaths are the result of head on collisions at night. There are many reasons for the high number of deadly collisions at night. As can be appreciated, drivers often become tired at night, headlights can blind drivers, many animals are nocturnal, and on a two lane road it is often difficult for a driver to determine if an oncoming car is on a collision course with the driver. In nearly all of these instances, if the driver could be warned of the impending danger, the driver could take corrective action and many such deaths could be avoided.

As we can all appreciate, even the most cautious drivers make mistakes, and further, reckless drivers are the biggest threat to safe drivers. For example, unsafe drivers may run a red light, not yield when they should, not stop when they should, travel too close, change lanes or direction suddenly, and swerve or wander into an adjacent lane. Arguably, the added distraction of mobile telephone usage while driving has made our roads even more dangerous. Other phenomena such as not seeing vehicles in a blind spot, not seeing ice or water on the road ahead, falling asleep, avoiding animals or debris on the road, and going too fast or exceeding the posted speed limit can all contribute to collisions, accidents and even death.

Collision detection systems and collision avoidance systems for vehicles have been attempted for many years, and in the 1990's the United States Department of Transportation (USDOT)'s National Highway Traffic Safety Administration (NHTSA) funded research on such systems and reported on the efforts and advances for Automotive Collision Avoidance Systems (ACAS) for the ACAS program. In this cost-shared project, NHTSA partnered with a consortium of corporations such as Ford and General Motors. Such an ACAS system is relatively complex and utilizes technologies such as forward radar sensing to detect and report objects that could cause possible collisions with the system vehicle.

The ACAS program has focused on implementing a "comprehensive" collision warning system, capable of detecting and warning the driver of hazardous situations to the front, sides, and rear of the vehicle. This approach used long range radar and various sensors for forward sensing, short range sensors for lane changes and backing up, and a lane detection system. Development in this comprehensive research is limited to providing warnings to the driver, and not taking active control of the vehicle based on detecting potential collision information. These radar based solutions are currently being developed in an attempt to reduce the number of accidents by providing a driver with collision warnings. For example, such as system can warn a driver of a vehicle in a driver's blind spot.

One of the drawbacks to current collision warning systems is the common occurrence of false alarms. Such false alarms can be caused by objects such as roadside signs or guardrails on a curvy road or detection of a car in an adjacent lane on a curved portion of the road. Also, radar systems lack sufficient resolution to distinguish and identify different objects. For example, a radar based systems often cannot distinguish a large truck from a motorcycle. These radar based collision warning systems act on the principle that enabling drivers to recognize their environment will enhance their safety but these systems lack sufficient resolution to provide the desired detail and accuracy of situations to the driver.

An additional category of collision warning systems focus on run-off-the-road crashes by monitoring the driver, and can detect and warns of drowsiness, inebriation or other impairments that may prevent the driver from safely operating the vehicle. These systems are being deployed most widely in trucks, because of the high costs of fatigue and drowsiness related crashes.

As stated above, collision warning system that make inaccurate assumptions or do not have adequate resolution do not make accurate warning to drivers and often provide false warnings that eventually become distracting. Such a system is generally counter productive to the main goal of informing a driver because frequent false warnings often lull a driver into ignoring the warning system.

SUMMARY OF THE INVENTION

The problems identified above are in large part addressed by the systems, methods and media disclosed herein to provide situational awareness systems, method and arrangements. In one embodiment digitized video can be acquired by a camera on a vehicle, and utilizing pixel differentiation at least one area of interest in the digitized video can be identified. The area of interest could be, for example, a group of pixels that represent another vehicle, a sign etc. Attribute information for the area of interest, such as size, movement etc of an object, can be acquired and then it can be determined if the attribute information is significant enough or important enough to set an alarm condition and notify the driver.

Attribute information for an area of interest that represents an oncoming vehicle may be the speed of the oncoming vehicle and a predicted path of the oncoming vehicle. Attribute information for an area of interest representing a sign may be the information on the sign and attribute information for a traffic light may be the illuminated color or lens of the traffic signal. The system can locate areas of interest based on detection of an edge or the intersection of two edges. Such edges generally define a boundary of an object and more importantly an area of interest with a point or series of points where edges change direction can provide important data regarding the outline or boundary of an object. When an object is identified in a series of frames the system can determine if the object is stationary with the earth or the object is moving in relation to the earth. The method can also determine if a location on the object is a collision threat or a perceived safety threat and when this is determined the system can activate an alarm condition.

In another embodiment a situational awareness system and apparatus are disclosed. The system/apparatus can include at least one camera and a pixel differentiation module to identify an area of interest in a video frame utilizing a pixel differentiation process. The pixel differentiation module can include an edge detector and an edge intersection detector or a point detector. The pixel differentiator can also include an attribute detector. The system can also include a pixel group tracking module to track movement of the area of interest in successive video frames and to acquire attributes and other situational awareness information. The system can also include an alarm system to determine if the situational awareness information meets a usefulness threshold and when the situational awareness information meets the usefulness threshold, the alarm system can provide an indication to the driver of the situational awareness system (SAS) equipped vehicle. Such an indication may be provided via a verbal description of the situation such as a perceived danger.

The system can also include a pixel group movement predictor to predict movement of the area of interest (i.e. an object) and to predict an impact of an object represented by the area of interest with the SAS equipped vehicle. To determine if an area of interest is moving in relation to its surroundings, the pixel group tracking module can determine a point at infinity that does not move (such as the sky just above the horizon) and detect motion of the area of interest in relation to the point at infinity.

In yet another embodiment, a computer program product is disclosed that can provide a computer useable medium having a computer readable program, wherein the computer readable program when executed on a computer causes the computer to acquire situational awareness information and provide the situational awareness information to a driver of a vehicle. The program product can acquire digitized video and utilize pixel differentiation to locate areas of interest in the video frames.

The computer program product can also determine attribute information of the area of interest and determine if the attribute information warrants an alarm condition. For example, the attribute information may be information regarding a moving object that is on a collision course with the SAS equipped vehicle. Other attribute information can include the size and velocity of the oncoming vehicle. In one embodiment the area of interest can represent a speed limit sign and the attribute can be the posted speed limit. Thus, the computer can determine the SAS vehicle speed from the acquired video, compare the actual speed to the posted speed and provide a warning to the driver that the driver is well over the posted limit. This would be particularly useful when a driver is approaching a small town on a highway and the posted speed limit is rapidly dropping while the driver is preoccupied with unrelated thoughts.

DETAILED DESCRIPTION OF EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The descriptions below are designed to make such embodiments obvious to a person of ordinary skill in the art.

While specific embodiments will be described below with reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Generally, methods and arrangements for a vehicular situational awareness system VSAS are provided. The VSAS can include at least one camera mounted on a vehicle and a video processor to process video acquired by the camera. In one embodiment, the processor can identify edges of objects or points representing an object or a portion of an object utilizing a pixel differentiation procedure. Such edges and points can define a shape or outline of the object. The pixel differentiation procedure can identify contrasts in, or differences between neighboring pixels or a group of pixels in a general area. Thus, a moving object can be detected when an edge or point feature is recognized in different locations in successive video frames. Detection of such "point or edge movement" via the contrasting pixel data in successive frames can provide attributes for the object that include direction, velocity, acceleration, and a projected course of the object. When an attribute reaches a predetermined level of importance and alarm can be set and the driver of the SAS vehicle can be notified by an alarm system. However, such detection and alarms are not limited to oncoming vehicles as any phenomena that a driver may be interested in, the system could detect and warn when the situation warrants such a warning.

For example, a traffic sign can be recognized based on its location, size and shape and attributes of the sign such as the subject mater of a sign can be identified and if some phenomenon occurs, or is occurring that is contrary to the determined attributes, the driver can be notified or warned. For example, the SAS can identify a stop sign or the presence of a red light at an intersection and if the SAS vehicle is not slowing down, or going too fast, the SAS can provide an audible warning to the driver of the potential danger. Additionally, the SAS can verbally provide the actual speed limit after acquiring speed limit information from the object (i.e. the sign) or provide verbal instructions for an evasive action, when a potential collision is detected.

Figure 1:
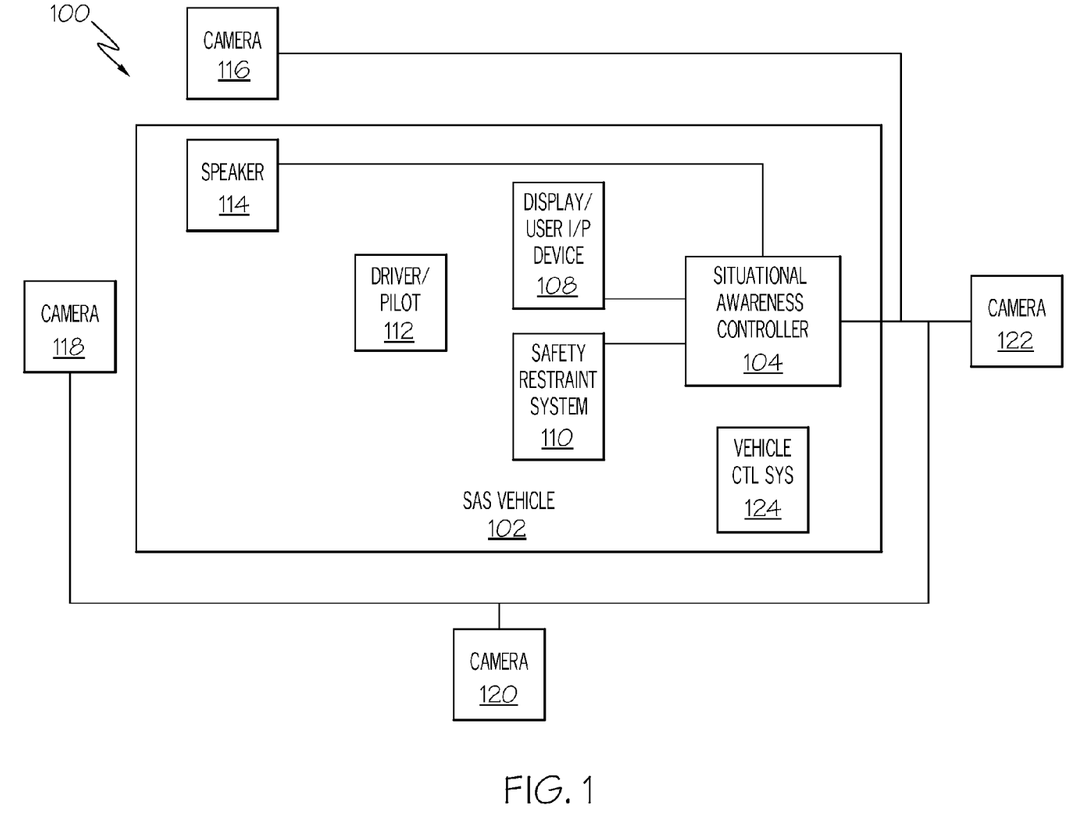
FIG. 1 depicts a block diagram of a vehicular situational awareness system (SAS)

Referring to FIG. 1 a vehicular situational awareness system (SAS) 100 for a situational awareness system (SAS) vehicle 102 is disclosed. The SAS 100 be mounted to various locations of the SAS vehicle 102. The SAS vehicle 102 could be embodied as a boat, a watercraft, a truck, a bus, a train, a helicopter, an airplane or any other moving object that can carry a human or cargo. The SAS 100 can include cameras, 116, 118, 120 and 122, (the cameras 116-122), a situational awareness controller 104, a display/user input device 108, a speaker 114, a safety restraint system 110, and a vehicular control system 124.

A forward looking camera 122 can be mounted on the front of the SAS vehicle 102 to acquire streaming video containing pixel data representing objects proximate to the road and approaching objects. The cameras can be basic "movie" cameras or even "web-cams" that provide a digital output. The cameras could be attached to, or built into the mirrors of the vehicle (i.e. the left, center and right rearview mirrors). The cameras could also be located in a pod on top of the vehicle for viewing objects on all sides of the vehicle. For large vehicles, such as buses, 18 wheelers or large airplanes there could be additional cameras to detect objects such as people or loading docks that will often be proximate to the vehicle at various locations during various events.

The cameras 116-122 can be a high resolution low LUX cameras that requires minimal light to acquire contrasting pixel data. The view range and direction of view of the cameras 116-122 could be dynamically adjusted. The cameras 116-122 can utilize a charge couple diode type technology, infrared sensors or any other video generating technology that can provide the required pixel data and resolution to detect edges, points and objects that are in an area of interest.

The approaching objects could be another oncoming vehicle, an animal on the road or even traffic signals and signs. Cameras 116-122 can be forward looking, side looking and rear looking and can detect objects or items that may pose a danger to the driver/pilot 112 of the SAS vehicle 102 from the front, sides or the rear of the SAS vehicle 102. The acquired video on all sides of the SAS vehicle 102 can sent to, and processed by, situational awareness controller 104. The situational awareness controller 104 can identify items in the acquired video data and provide verbal warnings to the driver/pilot 112 when a potential danger exists via speaker 114.

The situational awareness controller 104 can have a video processor that detects areas of interest, wherein the areas of interest may include pixels representing at least one object or item. The areas of interest can have edges and points where pixels go from a first color and shading, to a second color and shading that is detectably different than the first color and shading. Thus, neighboring pixels in an area of interest can be compared and an edge of an object can be detected based on patterns in the pixel data. A group of pixels that include an edge will have differentiable characteristics. The group of pixels can be monitored to detect movement of the group of pixels in relation to areas in the frames that do not move. Accordingly, the situational awareness controller 104 can detect movement of edges and points in successive video frames to determine motion attributes of the object that are represented by the points and edges. Generally, when such edges and points move to adjacent locations from frame to frame, while other areas in the frame remain relatively unchanged, the moving points and edges likely represent a moving object.

Accordingly, detecting edges within a video frame can be a first step in locating an object of interest and in detecting moving objects in the video. Generally, a fixed point can be located in a frame and the situational awareness controller 104 can distinguish that the distinct edge or point is moving relatively uniformly in relation to at least one fixed point in successive video frames. Alternately described, a distinguishable line or "boundary line" can be identified in sequential frames and when the distinguishable line is detected in an adjacent position in successive video frame, motion, direction, velocity and projected path of the object can be determined by the situational awareness controller 104.

The situational awareness controller 104 can utilize many different techniques of edge detection. For example, the controller 104 could identify a corner of an object unambiguously to within one pixel and movement of the corner pixel can be tracked in subsequent frames. The situational awareness controller 104 can also detect the presence of a traffic sign by its edges that form a specific shape, and the situational awareness controller 104 could initiate further processing utilizing optical character recognition to acquire the textual or numerical content of the sign. For example, the situational awareness controller 104 could identify edges of a rectangular sign of a particular dimension (a speed limit sign) and determine the speed limit from the speed limit sign and compare this to the actual speed of the SAS vehicle to determine whether the driver/pilot 112 should be notified of the situation. In one embodiment, when the situational awareness controller 104 determines that an unsafe condition exists, the situational awareness controller 104 can send control signals to one or more of the vehicles' control systems 124 such as brakes, steering, fuel, etc.

In a specific embodiment when the situational awareness controller 104 determines that an object or an item is on a collision course with the SAS vehicle 102, the situational awareness controller 104 can display such information to the driver 112 on display 108. Simultaneously, the situational awareness controller 104 could send audio to the speaker 114 such that the speaker 114 could provide the audio "observe traffic ahead" . . . "observe traffic ahead" . . . and possibly "Veer right to avoid collision." In another example, when the driver 112 is switching lanes, the situational awareness controller 104 could provide a danger avoidance message measure such as "traffic in your blind spot, maintain position in lane."

The situational awareness controller 104 could also be connected to a safety restraint system 110 of the vehicle. The safety restraint system 110 could prepare the vehicle in different ways for an impact based upon the situational awareness controller 104 detecting an eminent impact. For example, a seat belt could be clamped in a fixed position if the warning controller 104 has determined that an impact is eminent. In another embodiment, an air bag can be enabled if the impact is going to be a hard impact from a large object at a higher speed, and the airbag can be deactivated if a smaller object at a slower speed is going to impact the SAS vehicle 102.

In another embodiment, a vehicle control system 118 can receive input from the situational awareness system 104 and provide output signals to devices that can control the vehicle, such as a steering system, a throttle system of fuel system and a braking system. For example, fuel could be shut off prior to impact, and a steering control mechanism could turn the wheels to change the current path of the SAS vehicle 102. Additionally, the throttle could be decreased or the brakes could be applied via vehicle control system 124 to slow the vehicle in a dangerous situation.

Figure 2:
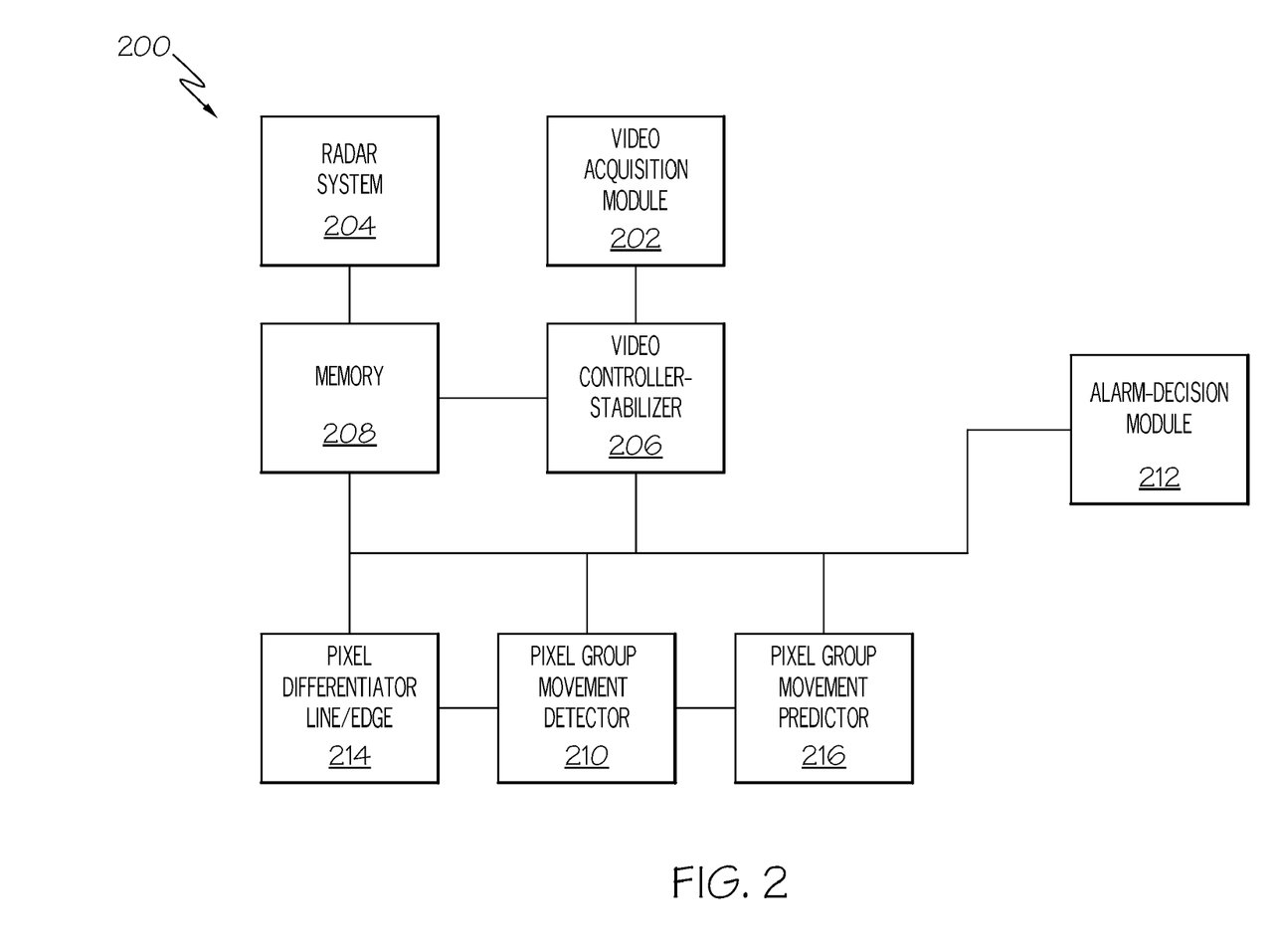
FIG. 2 illustrates a block diagram of vehicular situational awareness apparatus.

Referring to FIG. 2, a situational awareness apparatus 200 is disclosed. The apparatus can provide some of the features described above with reference to the situational awareness controller 104 of FIG. 1. The apparatus 200 can include a video acquisition module 202, a video controller-stabilizer 206, memory 208, a radar system 204, a pixel differentiator or line/edge detector 214, a pixel group movement detector module 210, a pixel group movement predictor 216, and an alarm-decision module 212. In operation, video acquisition module 202 can be a series of cameras that acquire video from multiple directions around a moving or non-moving vehicle. Video acquisition module 202 can support or include nearly all types of cameras.

In a specific embodiment, data from each camera is processed individually and analyzed individually for pertinent awareness information. Accordingly, the controller 206 can multiplex video and send a single camera generated signal to the pixel differentiator 214. The streaming or intermittent frames of video can also be stored in memory 208 and retrieved by pixel differentiator 214. Pixel differentiator 214 can scan pixels in each video frame and utilize pixel differentiation procedures to locate edges and points (pixel groups) that have recognizable contrasts that often represent objects.

The pixel group movement detector 210 can determine if a group of pixels are moving in relation to a "fixed" reference point and pixel group movement predictor 216 can predict a future path of the pixel group or the object represented by the pixel group. The word object as utilized herein should be given a very broad meaning to include any item that has at least a portion of a recognizable boundary such as a sign, a tree, an oncoming car, a pedestrian, a stoplight, a pothole, or any item that can be detected by the apparatus 200.

The video controller-stabilizer 206 can stabilize the data in the video frames provided by the video acquisition module 202. For example, the video controller-stabilizer 206 may have an internal gyro-scope or other solid state means for stabilizing a series of video frames that have discrepancies due to camera shake, and/or other camera movements often due to the vehicle suspension movements. For example, when a vehicle runs over potholes in the road, bounces over bumps, runs over debris in the road, goes up and down hills and makes turns, the majority of pixels generally will not move in relation to one another, but each pixel will change location with relation to the border of the frame keeping the same spatial relationship. Such a phenomenon can be utilized to stabilize the pixel data such that object information can be extracted from the video.

Thus, the camera shake or panning can be calculated utilizing the behavior or movement of a plurality of known fixed points within successive frames and methods to compensate for such movement can be utilized. More specifically, as the SAS vehicle turns, the camera will turn through an angle. Every point in the frame is generally affected identically in the amount the "co-ordinate drift" during the turn. The value of this drift or the angle can be calculated directly from the fixed point co-ordinates and then each frame can be motion compensated so that a series of frames appear to the pixel processing modules as if the car is traveling straight and level with no other relative motion. The amount of this compensation can be directly related to the angle through which the SAS vehicle has turned or the angle that the bounce causes the SAS vehicle to pitch, roll or yaw. This calculation can be performed on successive frames and the value of the angle or drift can be stored during the video processing to "stabilize" the video during pixel processing. In addition, the controller-stabilizer 206 can compensate for all relative motion by various other known methods, none of which would part from the scope of the present disclosure.

The controller stabilizer 206 can also provide "self calibration" of the video data. For example, if a camera is bumped and moves, or if there is a change in the loading of the vehicle (a heavy passenger or groceries list vehicle), the controller 206 can immediately calibrate itself to the new environment/modified frame data arrangement to compensate for such a change. In a particular embodiment, during installation of the system, a distance between each camera and the ground and the corners of the vehicle could be manually entered into, and stored by the alarm decision module 206.

Utilizing this distance and proximity information, and data from the pixel processing modules (i.e. 210, 214, and 216), regarding external objects, the alarm decision module 212 can accurately derive nearly all information required to allow the apparatus 200 to make decisions regarding the value or importance of the information created by the pixel processing modules) and whether the information acquired or detected by these modules 210, 214, and 216 rises to the level of notifying the driver via some form of alarm. Thus, such camera location information could be utilized by the alarm decision module 212 to determine a perimeter of the SAS vehicle and correspondingly, to determine if an oncoming object will impact the perimeter of the SAS vehicle based on the movement of the oncoming object with respect to the perimeter of the SAS vehicle.

Likewise, because traffic signs are placed along the road side in relatively uniform locations, a camera with the proper adjustment could locate or identify the sign based on such common locations if camera parameters such as high percentage locations for particular information are stored by, and utilized by the alarm decision module 212. Thus, the video acquisition module 202, the video controller-stabilizer 206, and memory 208 can acquire and store a series of normalized video frames to provide useful and useable video to video processing components such as the video data/pixel processing modules 214, 210 and 216.

Although not essential, radar system 204 can provide data that supplements the video data and the radar data can possibly be utilized to provide better depth perception and in addition cross check the validity of the video data. In one embodiment, information supplied by the radar system 204 can be utilized to validate the video data from the video acquisition module 202 particularly at night. The radar system 204 can provide/verify movement of objects and relative velocities particularly when minimal light is present or when the sun is projecting into a camera at sunrise or sunset.

For example, if the pixel differentiator 214 detects a center line of the road as an edge of an object, data from the radar system 204 could dismiss this edge (identify it as not protruding from the road and not moving in relationship to the road) and eliminate the center line as a possible collision threat. Further, an animal on the roadside that is not visible in low light conditions, possibly at night could be detected by the radar system 204. Alternatively, during low light conditions, the video acquisition module 202 could control the cameras to become more sensitive to the infra-red wavelengths, which would also allow vehicles driving without lights or other objects be detected.

As stated above, pixel differentiator 214 can retrieve video, frame by frame from memory 208 and detect objects and/or items based on abrupt changes in neighboring pixel values. Each pixel can have a value that is described in binary terms (i.e. with ones and zeros) and a variety of pixel values in a relatively small region of a frame can be identified as an area of interest. Pixels in the area of interest can be compared to each other by the pixel differentiator 214 to locate distinguishable differences (a differential) between pixels or specific patterns in the subject region. Such a compare process can be performed of the entire frame on start-up and then only in the areas of interest for many successive frames until a refresh is commenced at predetermined intervals.

The pixel differentiator 214 can locate edges of an object and the intersection of edges or an abrupt change in the direction of the line defining the edge. Such intersections that form a corner or a point on the object can be utilized to determine an outline and a shape of the object. An edge detection scheme of the pixel differentiator 214 can identify pixels in a relatively small area having a relatively abrupt change in value such as a sum change of the red-green-blue (RGB) values wherein the small area contains "neighboring pixels." This relatively small area can be an area of interest defined as a "3×3" a "5×5" or even a "16×16" pixel area. Defining the size of the area can depend on many factors such as the size of the object in the frame and the shape of the object. Thus, a square pixel area is often appropriate to locate objects but the area does not need to be square.

In a specific embodiment, a frame can consist of pixels which are represented by colors comprised of 256 ossibilities, (i.e. red, green and blue). The RBG values are typically represented digitally as bytes (eight bits) and thus, comparing values and determining the difference between pixel values can be accomplished by subtracting the RGB pixel values in different pixel locations and comparing the subtracted value to a threshold value or to other subtracted values in the frame.

In one embodiment, the pixel differentiator 214 can find an image gradient and highlight, tag or identify regions with high spatial derivatives. An edge detection algorithm executed by the pixel differentiator 214 can then track along this "region" boundary and suppresses pixels that appear as non-edge pixels or pixels that have values that do not correspond to "edge-like" values. This is often referred to as non-maximum suppression. The gradient array can also be sharpened by performing a hysteresis algorithm. A hysteresis algorithm can compare each pixel in the area of interest to a threshold value and pixel values below the threshold value can be set to a low value and pixel values above the threshold can be set to a high value. Such a process creates a significant contrast in pixel regions and can clearly define an object, an edge or a point by "sharpening" pixel contrasts by "exaggerating" pixel values.

Thus, in one embodiment, the pixel differentiator 214 can track along an object boundary (in a "zigzag" fashion) changing or modifying each individual pixel along a line to provide robust data regarding boundary points and corners of an object. In one embodiment, the pixel differentiator 214 can perform shape detection such as detecting a modified rectangle resembling an outline of a car or truck. In other embodiments, the pixel differentiator can focus a search for shapes such as a square, a rectangle or a triangle in location that gives the object shape a high percentage of being a traffic sign.

When a traffic sign is located, then the pixel differentiator 214 can utilize optical character recognition to acquire the data/information on the sign. In other embodiments, the pixel differentiator 214 can scan a high percentage location for a traffic light and recognize the shape of a traffic light and determine which indicator light on the stop light is lit or active. Such acquired data can be utilized to notify the driver of a situation such as driving faster than the speed limit and driving too fast to stop for an oncoming red stop light.

Generally, after areas of interest are located in subsequent frames, processing on remaining pixels that appear not to contain important situational information can be ignored or suppressed to free up additional processing power and memory to address the area of interest. Major contrasts or differentiatible pixels can be utilized to precisely identify "interest points" within an area of interest. Interest points can be corners of an object, which can be accurately tracked unambiguously from frame to frame. However, some digital image processing methods with a large number of pixels, cannot clearly define points when the image is analyzed at the pixel level. Corners, that appear to be clearly defined to the naked eye, can appear to a video processor as a fuzzy collection of similar pixels, much like the human eyes perception when viewing a small area close to the screen.

One way that pixel differentiator 214 can overcome this problem with resolution is to convert the pixel data to a grayscale and apply a Gaussian blur to smooth the differences from pixel to pixel. Then, the gradients of the pixel data can be calculated. Although this method yields excellent results in edge detection, it can be less favorable to utilize this method in some instances for precise identification of points particularly when identifying the same point in subsequent frames. Additional reasons why Gaussian blur type edge detection can provide less than desirable results, is that Gaussian blur methods can remove any clear identification regarding which pixel is at the corner point. Further, gray scale methodologies can reduce the accuracy of color identity to track the same point in subsequent frames and sharp corners are rounded in edge detection, making clear identification difficult.

In one embodiment, the pixel differentiator 214 can set an arbitrary initial number (differential threshold) T that must be exceeded for the system to detect an edge where an edge is defined as a sudden change in RGB values. Given two pixels (R1, G1, B1) and (R2, G2, B2), the value of $|R1-R2|+|G1-G2|+|B1-B2|$ can be utilized to determine the differential and indicate a sudden change in pixel value. Some edge detection theory states that the root-mean-square value should be used for best results, however calculating that value is much more computationally intensive than the equation/process described above and the equation/approximation above can provide acceptable results when the pixel differentiator locates pixel differentiations.

The variable E can be utilized to define the edge and the number of pixels to identify edges can be limited to "N" pixels where N can be defined arbitrarily as 1000. Therefore, T or the threshold that identifies pixel differentiation can be changed dynamically from frame to frame to keep N near 1000 pixels. This compensation process can work well to control the processing workload of the pixel differentiator 214 when the camera moves and detects different lighting conditions and objects, different traffic conditions etc. Thus, the variables T and N can be dynamically adjusted by the pixel differentiator 214 to provide optimal results.

The scanning process of the pixel differentiator 214 can also compare pixels and perform pixel differentiation on pixels that are not adjacent. For example, the pixel differentiator 214 can compare pixels that are three pixels apart in any direction. The maximum distance separating pixels to be compared, can be defined by the variable S. To detect an edge, pixel differentiator 214 can locate pixels in a line that exceed the threshold T for three successive calculations. When the values of these pixels meet the threshold condition, collectively they can be labeled as an edge by the pixel differentiator 214. This successive compare process can reduce the amount of noise introduced into the detection data.

The pixel differentiator 214 can tag and index edge pixels and group pixels that are in proximity to at least a portion of an outline or edge of an object to create or define the area of interest. Each area of interest can be processed separately or as a block of data by the pixel group movement detector 210 and the pixel group movement predictor 216.

A typical frame of video has rows and columns. In one embodiment, every row of pixels can be scanned (about 480 rows) and every column can be scanned (about 720 columns) during a pixel differentiation process. A typical national television system committee (NTSC) compliant video camera provides 29.97 frames per second. The pixel differentiator 214 can ignore or discard many frames, such as every other frame, to reduce the processing load. As long as the required integrity and accuracy for objects, attributes and data is maintained a slower sampling rate for example every fifth frame could be utilized or processed by the pixel differentiator.

Processing every other frame allows a reduction in video to be processed by the pixel differentiator 214. A more " indepth"processing of less frames can prove beneficial. For example, processing every other frame allows the pixel differentiator 214 to accurately analyze about 2000 points per frame. As stated above, the RGB values and their coordinates proximate to an edge can be identified as having a pixel gradient or change in value that is greater than a predetermined threshold value. These RGB values and gradient values can be utilized by the pixel group movement detector 210 to provide additional verification that the system is tracking the same object from frame to frame by searching for such values in subsequent frames in adjacent or neighboring locations. Tacking pixel data from six cameras at fifteen frames per second can be computationally intensive; however, selective processing of areas of interest and limiting the processing to specific cameras can reduce the processing power required for the pixel processing devices 214, 210 and 216.

In addition to detecting edges, the pixel differentiator 214 can also detect significant points within an object boundary or inside the edges that define the object. The pixel group movement detector 210 can be tailored to identify these points unambiguously in successive frames. Thus, the pixel "group" movement detector 210 can detect movement of a single pixel, if the pixel is distinguishable. As stated above a point can be defined as a pixel that appears in both the horizontal and vertical scans as an edge where an edge changes direction suddenly (the edge turns a corner, changes direction, or stops abruptly).

Generally this type of point can be relatively easy to identify and can be reliably tracked in successive frames by the pixel differentiator 214. In order to detect corners or points that represent corners, each edge can be scanned pixel-by-pixel by the pixel differentiator 214, utilizing the three point (RGB) scan method above. In one embodiment, while performing a pixel differentiation scan method along an edged in a two by two matrix, the gradient between the first two pixels can be compared with the gradient between the third and fourth pixels.

There will be a difference in pixel values when a turn occurs, where the gradient between the second and third pixels will not be as great as the gradient between pixels one and two. In fact, the gradient between pixels three and four may not exceed a threshold value when an edge turns as little as 1 radian. This point detection process can tag one or more of the four pixels as defining a point or a corner. For further processing, the point could be defined as an "Object" in for example a Java based program. Properties for the Object or point could include colors, edges leading up to the point, and an intensity of the RGB changes at the point co-ordinates.

As stated above, the situational awareness system 200 can employ an edge detection process that includes image processing and feature extraction. When an edge of an object can be recognized in successive frames, parameters of the object such as the velocity and direction in relation to the vehicle can be determined by pixel group movement detector 210. Thus, pixel group movement detector 210 can determine if a detected edge, point or object is either stationary or moving, what direction it is moving and at what velocity it is moving possibly using vectors to describe such movement.

As can be appreciated, particularly for forward looking video and rearward looking video, stationary objects behave in a particular manner and moving objects behave in a particular manner. One way that the pixel group movement detector 210 can distinguish moving objects from non-moving objects is to identify a single point referred to herein as, "a point at infinity" straight ahead of the SAS vehicle in the upper portion of a frame. Generally, when the video is stabilized and as the camera moves in a straight line, all stationary objects will appear to move towards the single point, or away from the single point.

In one embodiment, the pixel group movement detector 210 can focus video processing on an area defined by a matrix where an oncoming vehicle would typically approach. The pixel movement detector 210 can assume that all objects are moving and coordinate variables such as (r, s) can be the focus of the calculations related to the oncoming vehicles. Pixel group movement detector 210 can locate moving objects by acquiring differentiation data from pixel differentiator 214 and track the movement of points, edges or an outline that may be associated with an object. Pixel differentiator 214 can provide the matrix location and matrix size within the frame where the point of interest is located for each frame, and the pixel group movement detector 216 can track a pixel, a point, or a group of pixels.

This point of interest can be identified with the co-ordinates (r, s) in a first frame or frame zero. Subsequent frames or images can be given the numbers 1, 2, 3 etc. The time between frames can be defined by T. The distance of the camera above the ground can be defined by H. A constant for the video which gives the angle in radians between two adjacent horizontal or vertical pixels can be defined by C. The pixel group movement detector 210 can operate on the assumption that angles are small so that tan(angle)=sin(angle)=angle in radians.

In the equation below, utilizing the above variables, and assuming a second vehicle is moving with, but behind and to the side of a SAS vehicle the second vehicle can be identified by the left, right and bottom edges by x=a, x=b, y=c. Also, a fixed point on the road can be defined as having y coordinate f. Utilizing computer executable instructions, the distance to the second vehicle can be calculated as $D=H/(C*(s-c))$. The relative speed of second vehicle can be calculated as $V=(H/(C*T))*(1/(s-c1)-1/(s-c2))$. The distance or gap between the SAS vehicle and the second vehicle can be calculated as $G=(H*(a-r))/(s-c)$ and the absolute speed of the second vehicle can be calculated as $VA=(C*(f1-f2))/T$.

These equations can be utilized assuming that the frame is stabilized or compensate for the drift associated with each frame. The video frames or images from the camera can be normalized into an array with 1024 pixels in the horizontal dimension. Such stabilization and uniformity of the video frames allows a universal program to process the pixel data.

As stated earlier, deaths resulting from head on vehicle collisions at night are disproportionately high when compared to other non-lethal vehicle accidents. The pixel group movement predictor 216 of the situational awareness system 200 can anticipate such a head on collision or other collision and warn a driver of this danger before the collision actually occurs. At night, nearly all cars have their headlights on, and although headlights will typically be detected by the video acquisition module 202, the light beam may not provide a distinguishable point or edge particularly as the oncoming car hits bumps in the road and turns corners. Further light from a headlight disperses making it difficult to locate an edge.

However, where the light beam of the headlight of the oncoming vehicle hits the ground or pavement in front of its bumper, a relatively steady edge is typically created and can be detected by the pixel differentiator 214. Likewise, where a left front tire of an oncoming vehicle touches the pavement an edge will often be detectable by the pixel differentiator 214. Thus, these areas can be identified as a focus area for a pixel processing by pixel differentiator 214 to determine edges, points and to track motion of an oncoming vehicle.

Depending on the adjustment of the headlight, an average position for the lower portion of the headlight beam to hit the ground in front of the vehicle is less than five feet in front of the front bumper of the oncoming vehicle. Due to the close proximity of the pavement in front of the vehicle, the headlight will typically create a "pool" of light on the ground just in front of the vehicle. This pool of light can provide an object edge (sharp contrast in pixel data) detectable by pixel differentiator 214 that is a known location in relation to the vehicle and moves at the same velocity and direction as the oncoming vehicle.

Further, the location of this pool of light and particularly a tire edge moves relatively little when the car bounces due to bumps in of the road. Thus, a detection of a moving edge (pool of light, tire etc.) acquired by pixel group movement detector 210 can provide baseline data (what the edge is and how it is moving) to pixel group movement detector 216. When it is determined what the pixel differentiator has located then the perimeter of the oncoming vehicle can be estimated. For example an outside of a tire is typically close to the side edge of a vehicle and based on the predicted path of the known edge of the vehicle, for example, the velocity, direction, and acceleration of the front left corner of the oncoming vehicles bumper, the alarm-decision module 212 can determine the possibility of a collision and set an alarm or alert the driver of such a possibility.

In addition to the types of information discussed above that can be provided by the situational awareness apparatus 200, the apparatus 200 can determine many other potentially dangerous situations. For example the situational awareness system 200 can determine if:

a. a vehicle or driver is in danger of hitting something possibly during a lane change;
b. the SAS vehicle is too close to a vehicle in front of the SAS vehicle;
c. a vehicle behind the SAS vehicle is too close;
d. the SAS vehicle is traveling too fast to stop for an approaching red light;
e. a vehicle approaching the SAS vehicle from left or right is slowing to stop for their stop sign or red light;
f. ice or a pool of water is detected on the road ahead;
g. the driver of the SAS vehicle is driving over the speed limit and by how much;
h. the driver of the SAS vehicle is weaving and not maintaining a lane;
i. there is debris is on the road;
j. there is an animal near the edge of the road;
k. detection and notification of stop signs, yield signs and traffic lights;
l. merge conditions on a freeway;
m. distance and relative speed of any vehicles in surrounding the SAS vehicle;
n. speed patterns of any vehicles
o. vehicles in the blind spots or at the sides of the SAS vehicle
p. if a vehicle that is beside the SAS vehicle is moving too close or not behaving normally;
q. situations where the driver of SAS vehicle cannot see very well such as when the driver is driving into the sun, there is fog or heavy rain, there is frost, condensation freezing precipitation or rain on the windshield. In such a case the video and warnings can be displayed to the user on a heads up display and an alarm can be sounded and a verbal warning can be provided to the driver of the SAS vehicle.

Ice and water on a road each produce flat surfaces with reflective images. The forward facing camera can detect such a phenomenon through the reflection and refraction of light. Such reflection and refraction will be different from a reflection to normal movement of an object and from movement of a fixed object. For example, a reflective surface will often sparkle when illuminated by light and the sparkle and reflection will change with moving objects. When the SAS vehicle is moving on a freeway with dashed lane markers or reflectors on the side of the road or in the center of the road, the pixel group movement detector 210 can calculate important information utilizing the relative movement between the SAS vehicle and the detected dashes, bumps or reflectors. This marker data can also be compared to the forward looking data to provide improved speed calculations.

Figure 3:
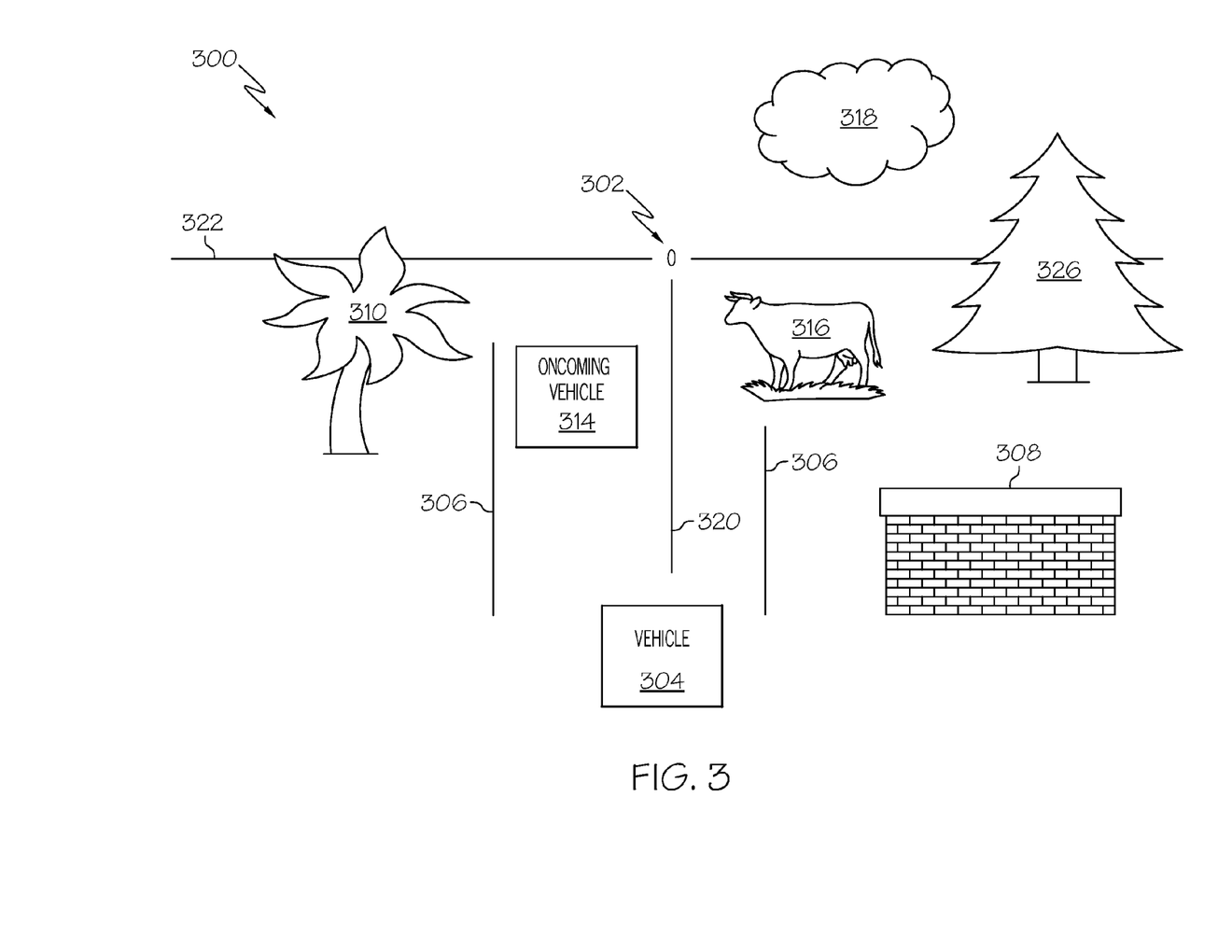
FIG. 3 depicts a graphic of one way a vehicular situational awareness apparatus differentiate moving objects from stationary objects in successive video frames.

Referring to FIG. 3 an edge/point detection methodology that could be utilized by the pixel differentiator 214, the pixel group movement detector 210, and the pixel group movement predictor 216 of FIG. 2 is depicted. As stated above, the pixel differentiator 214 of FIG. 2 can detect two types of edges/points, those representing fixed objects and those representing moving objects. These points can easily be distinguished by the pixel group movement detector.

The pixel group movement detector can find a point at infinity 302 that shows little or no movement relative to the SAS vehicle 304. The point at infinity 302 can be a point that is directly in front of the SAS vehicle 304 many miles ahead possibly a point in the sky above the center of the road (wherein the road is defined by road edges 306 in FIG. 3) being traveled by the SAS vehicle 304. Thus, the pixel data at the point of infinity 302 will remain relatively constant (will not move in relation to the frame boundary) assuming that the video has been stabilized.

Points in identical regions in successive frames can be examined to detect motion of the points relative to the point at infinity 302 (a non-moving point). Generally, all points representing fixed objects (tree 310, tree 326, cloud 318, road edges 306, and wall 308) will appear to be moving towards, or converging on a single central point, the point at infinity 302. However, points detected from moving objects such as oncoming vehicle 314 and moving animal 316 will not appear to be converging on the point at infinity 302 the same as the non-moving objects. Thus, the points that represent fixed or relatively slow moving objects (318, 310, 326, 308 and 306) can be differentiated from points that represent moving objects (i.e. 314 and 316).

To improve the accuracy of detecting moving and non-moving points, the pixel movement detector can determine an imaginary horizontal reference line 322 in the image or frame. Forward and backward facing cameras can utilize the "behavior/non behavior" of fixed points in successive video frames as a basis for the movement analysis. Points located a long way from the camera will appear to converge about the point at infinity very slowly. Points that are near the camera will converge much quicker. Thus, distance between objects and the SAS vehicle can be determined utilizing this phenomenon.

A vertical reference line 320 can also be drawn from the camera to the point of infinity 302. The vertical reference line 320 is a line that can separate identical behavior, where the convergence behavior of non-moving points to the left of the vertical line 322 are nearly identical to the convergence behavior of points to the right of the vertical line 322. The horizontal line 322 and vertical line 320 are thus imaginary lines that can assist in detecting which objects are moving and which objects are relatively stationary in relation to the earth.

The coordinates of the point at infinity 302 can be saved for future use and could be utilized during power up or initialization of the system to locate a point at infinity as this point may be "re-useable." The point at infinity 302 can be identified as a specific pixel in the frame or camera image and the point at infinity 302 may change if a vehicle loading adjustment occurs due to forces on the vehicle or a camera gets bumped and changes orientation. Thus, the point at infinity 302 can be recalculated periodically to allow for such changes.

The horizontal line 322 can be the lowest line at which objects at a long distance from the camera do not appear to move in a frame-to-frame analysis. Establishing a horizontal reference for all cameras such as side cameras can assist in the video processing because side cameras will normally be aimed slightly towards the ground in order to detect vehicles alongside the SAS vehicle as well as vehicles approaching from the side. Thus, points and edges that are non-moving can be eliminated from the analysis leaving a smaller number of points and edges that can be grouped as areas of interest for analysis.

In one embodiment, all fixed points can be recorded as objects in certain commercially available software applications such as a Java based application and the stored object data can utilize only five points in frame-to-frame calculations to locate interest points. Utilizing five points will reduce the overall processing load for the video processing components. Generally, making a full scan of a frame once every second can provide acceptable resolution for detection of a dangerous situation.

After compensating for drift, the non-moving points from successive frames will appear to converge in relation to a specific point for a given SAS vehicle. Every SAS vehicle can have a unique convergence point, and thus few if any points will coincide with the point at infinity 302 based on the location of the cameras. An object can be created for every vehicle based on an interest point, the edges and/or the edge colors that are related to the oncoming vehicle 314. For vehicles, a rectangular outline or series of edges can be acquired, defining the extreme left, right, top and bottom of any point or edge associated with the oncoming vehicle 314. In one embodiment this rectangle can be defined by a bitmap frame. Given the rectangular edges of the on-coming vehicle and the co-ordinates of the point at infinity 302, the system can apply the formulae above and add additional information about the vehicle/object such as velocity projected path etc, into the bitmap frame. Such information can be updated every three seconds because more frequent updates may be unintelligible to a user.

Figure 4:
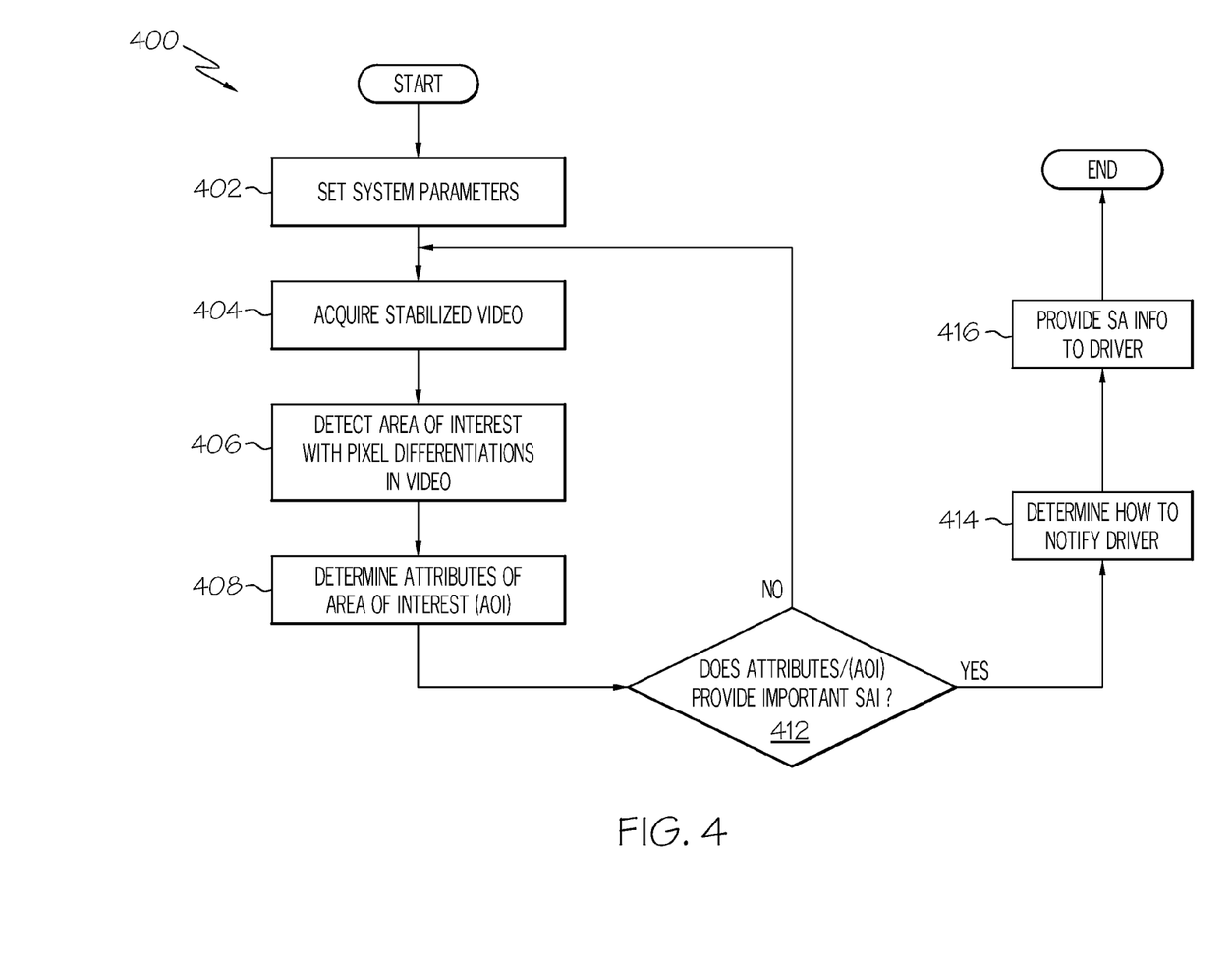
FIG. 4 illustrates a flow chart depicting one method for providing situational awareness to a driver of a vehicle.

Referring to FIG. 4 a flow chart 400 of a method for a vehicular situational awareness system is disclosed. Initially, the system can record set-up parameters, as illustrated by block 402. As described above, camera locations, refresh rates, warning modes and system configurations can be loaded into, and stored by the system. A user can select, what situations will trigger an alarm, whether the user wants to be notified by an audible warning, a heads up display, or by some form of indicator on an instrument panel. In other embodiments, the user can determine whether they want the system to automatically override the actions of the user and steer or brake the vehicle based on detection of a pending collision.

In addition, setting the system parameters can include calibrating the system. One such calibration can include entering a distance from each camera to the ground and from each camera to corners of the vehicle adjacent to the camera. Thus, the system can be user configured and calibrated in many different ways without parting from the scope of the present disclosure.

Successive stabilized video frames can be acquired via cameras and a video stabilization module as illustrated by block 404. Such stabilization of the video can remove or describe any pitch, roll, yaw and translation of the SAS vehicle as SAS vehicle moves or is loaded. As illustrated by block 406, a pixel differentiation module can utilize a pixel differentiation process to detect an edge and traverse the edge to find points or the intersection or ends of edges and can identify a shape of an object after traversing all edges and points of an object. As stated above, a point can be defined as a sudden change in the direction of an edge, the end point of an edge or as a "stand alone" object of small dimensions.

A dynamic threshold can be maintained by the pixel differentiator for the "cut off" value to identify how much of a change (minimum differential) is required in RGB values and other pixel values to identify an edge. This threshold can control the number of area of interests and number of pixels that are regarded as edges, and thus provide an acceptable load to the pixel processing equipment. The processing capabilities of the system can be utilized to set such a threshold. For example, a pixel differentiation module processing twenty frames per second will perform approximately one million pixel differentiation/edge detection executions for every frame. Thus, if the video processing equipment cannot achieve such speeds the number of frames analyzed per second by the processing equipment can be decreased.

For acceptable point detection, pixel differentiations can be calculated over several pixels in the area of interest, of which one pixel on each side of an edge or in a specific pattern may be optimal processing scheme. Thus, a point may not be identified as an edge unless it is consistent over three different pixel calculations. In one embodiment, all edges can be reduced to a line that has a single pixel width by identifying the first pixel detected as having the differential and performing the pixel differentiation process on each side of the edge up and down the edge. Such a process can be achieved with reduced processing power compared to traditional systems.

The pixel differentiation module can also recognize shapes and objects and utilize optical character recognition and other processes to acquire data from signs and other important situational awareness information. The pixel differentiation process for an area of interest can also classify or name objects that have recognizable shapes. For example, a moving vehicle can be converted into a moving rectangular box to create a precise and unambiguous identification of a vehicle with a precise boundary. In another example, a non-moving two-dimensional shape on a pole can be labeled by the system as a sign or a traffic light.

To assist in such a recognition process, high percentage locations and predetermined recognizable/matchable shapes of specific sizes can be stored in a memory, and when a shape complies with such a predetermined shape and activity in a high percentage location the shape can be given a name attribute such as sign, a tire, or headlight reflection on the pavement. Such information be utilized to specialize the type of warning given to the driver.

In an alternate embodiment, once a sign is detected, the angle between the direction and the point at infinity can be utilized to calculate a normalized image, as if the sign is being viewed directly from the front. Pattern recognition can be utilized by storing the expected patterns of most common road signs and comparing the stored pattern with the pattern on the surface of the sign. Pattern recognition may be more efficient that performing optical character recognition because of the limited number of different signs and speed limits that are normally encountered by the system. For example a sign might read "SPEED LIMIT 30" in a standard format and this format could be stored by the system and utilized during the compare process. The system could also determine attributes of stop signs, yield signs, and school signs by such a pattern recognition process.

Thus, as illustrated in block 408, attributes of areas of interest can be determined. When the video processing components track points from image to image there can be two distinct phases, a start up phase, or refresh phase, and an area focus phase. The start up phase can occur when a vehicle starts and a refresh phase can occur periodically to see if new objects have appeared or when a vehicle is turning and the reference data is no longer current. During start up and refresh there might be no accurate history (or previously stored frames) and the system can analyze every pixel in the frame to locate interest points utilizing pixel differentiation and the point of infinity.

Once the interest points and general movement of the interest points are known or a set of moving points have been identified, subsequent frames can be processed incrementally or as subsets of the entire frame in a focus phase. Such a compressed analysis can be performed with relatively low computational power. For vehicular applications a refresh or entire pixel differentiation scan can be done every second, but for a SAS system in a fighter aircraft the refresh cycle might require a shorter refresh period. If the video is compressed inter frame data could be utilized to locate the moving interest points.

During start-up/refresh, points can be identified in the first two frames and then a comparison or pixel differentiation can be performed to locate points. Points that clearly match in successive frames and move an acceptable number of pixels in the successive frames can be tagged as an area of interest. Other points showing no pixel differentiation or relative movement can be discarded from the analysis. If there are 500 points identified in each image and 100 points are identified as clearly matching, such an analysis can prove successful to provide accurate situational awareness information for most conditions. The numbers of moving points that are identified and continually processed can be adjusted dynamically from frame to frame simply by altering the threshold value. Thus, in subsequent point processing, only a subset of the identified points may be processed. In most conditions the location or movement of each point can be predicted to within a few pixels in subsequent frames. Thus, the system can utilize predictive methodologies and areas of focus such that minimal computing power is required to provide situational awareness.

In one embodiment, point identification might only be utilized when pattern matching and edge detection do not produce acceptable results. The SAS system could also be utilized in military applications to identify troops, machines or oncoming aircraft, for terrain recognition applications to augment the capabilities of a global positioning system (GPS). The SAS could also help the visually impaired, security applications that identify people, and area management applications (such as parking lots).

As stated above, attributes of points, shapes and edges can include attribute information such as an identifier of the object (i.e. whether the edge is a car, a pool of light or an edge of a tire). Attributes can further include whether the shape defines a size, velocity and deceleration of a moving rectangular box (i.e. a vehicle). In addition, each identified shape or edge can have attributes such as a distance from the shape/area of interest to the SAS vehicle, relative speed, and what the gap will be between the shape and the SAS vehicle at a closest point of intersection. To make such alarm decisions, the system can utilize data regarding direction, velocity and acceleration/de-acceleration of the SAS vehicle at every stage/frame in the acquired video.

In a particular embodiment an interest point can be defined or identified by pixel data in which there are five directions from a point pixel with a pixel value higher that a given threshold and two directions having a pixel values that are lower than a/the threshold. The eighth direction can have any pixel value. An analysis in five directions can eliminate a case where a point is perceived but the pixels define a straight edge. Analysis in two directions can be selected to eliminate the spurious cases that can arise if only one direction from the center pixel exhibits a value lower than the threshold.

Once a potential interest point and/or area of interest have/has been identified, the characteristics of the point/area can be evaluated for pixel group movement. Pixel differentiation can again be utilized to identify "identical" pixel differentiations/point in subsequent frames. A 3×3 matrix (i.e. a pixel group or area of interest) can be analyzed to calculate magnitude and direction of the point utilizing data from the time progression of frames. Generally, in the area of interest the RGB values will remain relatively constant. At a minimum there are typically two or three directions from the point pixel which the RBG values (i.e. color) are constant. The matrix format can be utilized to calculate the average direction of movement of these RGB values and the magnitude of the skew. Analyzing such an area of interest and ignoring unimportant pixel areas with a low differentials and skew, can focus the processing power on more important locations.

For some pixel analysis, the area of interest may be expanded. For example, the "fuzziness" of a point can be calculated by looking at the 5×5 matrix surrounding the point. If there are any other interest points in this matrix that have similar point characteristics, the strongest pixel value can be selected as the point of interest and the others can be ignored. Many different types of data can be associated with, and stored for, each point or pixel. For example, much like compression routines, the difference characteristic and digital values for each point, the direction each point is moving, the magnitude of each point, the fuzziness of each point and how many pixels around the point are not under consideration can be calculated and stored to enhance the details or "meta-data" regarding the video. Thus, in one embodiment, data about the video can determine the most important points of interest, the points having the highest magnitude, the largest direction value, the highest relative speed and the lowest fuzziness factor and this data can be utilized to determine the highest priority objects.

One way to achieve such edge/point/shape/object/attributes/movement detection is to utilize a Gaussian blur technique analyzing pixels in a 5×5 matrix that surround an interest point. In one embodiment a Gaussian blur can be calculated in 8 different directions from an interest point pixel. A weight can be given to each pixel in the 5×5 matrix and the weight of the pixel can ensure a cumulative value of zero if all the pixels are the same color in any given direction. In this embodiment each color can be analyzed separately. At then end of the calculation for eight different directions there will be 24 values—(eight different directions and 3 values representing red, green and blue for pixels in that direction).

In one embodiment, two threshold values for pixel differentiation can be utilized. The first or "low" threshold value can be utilized to determine if a particular direction from an interest point pixel has pixels of the same color (same value). This can be defined as a value between +10 and −10 and can be kept constant because this value typically has very little sensitivity to the "point identification value." The second or "high" threshold value can be utilized to determine if a particular direction from an interest point pixel has pixels that are significantly different from the interest point.

The high value will usually be a value that is greater than 100 or less than −100. The threshold values can be varied dynamically to limit the number of pixels that are identified as interest points and require processing. Typically, the video processing equipment will work more efficiently if the number of interest points being processed at any given time is kept to a few hundred. Accordingly, the pixel differentiator can adjust the number of interest points from frame to frame in an attempt to keep the number of interest points relatively constant such that the video processing systems can provide current and accurate data. The processing load can also be adjusted by limiting the matrix of the area of interest. For example, each area of interest can be limited in dimension such that each group of points or area of interest does not have an excessive number of points or pixels to process.

Additional methods could be utilized to increase the accuracy of movement detection of points and objects. For example, directions with high pixel differentials are often representative of background color that may change significantly from frame to frame. However, the low differential directions are often representative of a moving object and the color of a moving object in most cases will not change significantly from frame to frame. Environments where there is significant lighting change from frame to frame can be tracked by comparing the ratios of multiple RGB values in different areas of the screen. For example, if the sun goes behind a cloud or the SAS vehicle enters a tunnel, then all pixel values will generally change proportionately. Accordingly, if most of the pixel values decrease proportionately, then it can be assumed that nothing has changed color but that different lighting conditions exist.

As illustrated by decision block 412 it can be determined by an alarm decision module if the area of interest and its attributes provide situational awareness information (SAI) that rises to a level of importance, such that the driver should be notified. Per the system set up parameters according to block 402, the alarm decision module can determined if the situational awareness information rises to an importance level such that the driver should be notified of such information. For example, if a user sets up the system to provide speed limits, and a sign and the speed limit marked on the sign is identified, the alarm decision module can determine that the SAS vehicle speed is traveling fifty five miles per hour and the actual speed limit is thirty five miles per hour and provide audio such as, "You are traveling 15 miles per hour over the speed limit."

Additionally, the areas of interest can be classified as moving and non-moving and as threats and non-threats. Generally, when a driver is alert and the SAS vehicle is under control, non-moving edges would be non-threats. For example, a center line marking on a highway can be detected as a non-moving edge and as a non-collision threat. Alternately, a pool of light projected in front of a bumper of an oncoming car can create a moving edge that is related to a moving object (i.e. the moving vehicle) and thus, this moving edge can be defined as a threat particularly when the oncoming vehicle's projected path will lead to impact with the SAS vehicle.

The system can examine the moving points in successive frames and extrapolate the data to find that the lines of extrapolation for each vehicle pass through a single point. The system can create a unique set of points for a moving vehicle that marks the extreme horizontal and vertical extents of the vehicle and establishes a rectangle that exactly encompasses the entire vehicle. If one vehicle obscures another, this can be determined by the system and the system can fill in the missing perimeter.

Generally, only a small part of two adjacent edges is required to calculate where a vehicle is going and at what velocity, once the object parameters are established the oncoming vehicle. Hence the system can identify, speed, road position etc of a set of vehicles that dynamically overlap each other in the video frame.

If at decision block 412 it is determined that the attributes of the area of interest do not provide important information the process can revert to block 404, and if at decision block 412 it is determined that the attributes and the area of interest can provide important situational information, the alarm decision module can determine how to notify the drive as illustrated in block 414. The situational awareness information can then be provided to the driver as illustrated in block 416 and the process can end thereafter.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods, systems, and media that provide a driver with situational awareness information. It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising:
   acquiring, by a video acquisition module utilizing at least hardware, a digitized video comprising pixel data;
   performing pixel differentiation to locate differentiations in the pixel data in a video frame of the digitized video, by a pixel differentiation module;
   defining an area of interest in the pixel data of the video frame, by the pixel differentiation module, the area of interest comprising a pool of light produced by a headlight of a vehicle on the ground with an identifiable edge in front of the vehicle; and
   detecting attribute information of the area of interest by an attribute detector to track edges of the pool of light to determine a distance and a sideways separation of the vehicle and to compare the edges with other attribute information for the vehicle to determine a speed of the vehicle.

2. The method of claim 1, further comprising projecting a path of the vehicle.

3. The method of claim 1, further comprising scanning at least one edge of the object to locate a point of interest.

4. The method of claim 1, further comprising enhancing the pixel data by acquiring the radar data.

5. The method of claim 1, further comprising utilizing a point at infinity to determine the attribute information comprises at least one attribute that is moving in relation to the earth.

6. The method of claim 1, further comprising determining if the attribute information for the vehicle indicates that the vehicle represents a collision threat.

7. The method of claim 1, further comprising triggering an alarm if the at least a portion of the vehicle represents a threat.

8. The method of claim 1, wherein detecting attribute information of the area of interest comprises detecting where a light beam of the headlight of the vehicle hits the ground in front of a bumper of the vehicle.

9. The method of claim 1, wherein detecting attribute information of the area of interest comprises detecting edges where a front tire of the vehicle touches the ground.

10. An apparatus comprising:
    a video acquisition module utilizing at least hardware to acquire a digitized video comprising pixel data;
    a pixel differentiation module to perform pixel differentiation to locate differentiations in the pixel data in a video frame of the digitized video and to define an area of interest in the pixel data of the video frame, the area of interest comprising a pool of light produced by a headlight of a vehicle on the ground with an identifiable edge in front of the vehicle; and
    an attribute detector to detect attribute information of the area of interest to track edges of the pool of light to determine a distance and a sideways separation of the vehicle and to compare the edges with other attribute information for the vehicle to determine a speed of the vehicle.

11. The apparatus of claim 10, further comprising a display to display information based on the attribute information.

12. The apparatus of claim 10, further comprising a pixel group movement predictor to project a path of the vehicle.

13. The apparatus of claim 10, wherein the pixel differentiation module defines the area of interest in the pixel data of the video frame by performing shape detection to detect a portion of a shape and performing optical character recognition to acquire textual and numerical content if the shape is a sign.

14. The apparatus of claim 10, further comprising a pixel group movement detector to utilize a point at infinity to compare the attribute information with other attribute information to determine if the vehicle is moving in relation to the earth.

15. The apparatus of claim 10, wherein the pixel differentiation module detects attribute information of the area of interest by detecting where a light beam of the headlight of the vehicle hits the ground in front of a bumper of the vehicle.

16. The apparatus of claim 10, wherein the pixel differentiation module detects attribute information of the area of interest by detecting edges where a front tire of the vehicle touches the ground.

17. The apparatus of claim 10, wherein the video acquisition module is sensitive to infra-red wavelength during low light conditions.

18. A computer program product for providing situational awareness, the computer program product comprising:
    a computer usable storage medium having computer usable program code embodied therewith, the computer usable program code comprising:
    computer usable program code configured to perform operations, the operations comprising:
    acquiring, by a video acquisition module utilizing at least hardware, a digitized video comprising pixel data;
    performing pixel differentiation to locate differentiations in the pixel data in a video frame of the digitized video, by a pixel differentiation module;
    defining an area of interest in the pixel data of the video frame, by the pixel differentiation module, the area of interest comprising a pool of light produced by a headlight of a vehicle on the ground with an identifiable edge in front of the vehicle; and
    detecting attribute information of the area of interest by an attribute detector to track edges of the pool of light to determine a distance and a sideways separation of the vehicle and to compare the edges with other attribute information for the vehicle to determine a speed of the vehicle.

19. The computer program product of claim 18, wherein the operations further comprise projecting a path of the vehicle.

20. The computer program product of claim 18, wherein the operations further comprise scanning at least one edge of the object to locate a point of interest.

* * * * *